US006979719B1

(12) United States Patent
Hobel et al.

(10) Patent No.: US 6,979,719 B1
(45) Date of Patent: *Dec. 27, 2005

(54) COATING COMPOSITION COMPRISING A COMPOUND COMPRISING AT LEAST ONE BICYCLO-ORTHOESTER GROUP AND AT LEAST ONE OTHER FUNCTIONAL GROUP

(75) Inventors: Klaus Hobel, Oosterbeek (NL); Huig Klinkenberg, Katwijk aan Zee (NL); Arie Noomen, Voorhout (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,061

(22) Filed: Feb. 22, 2000

Related U.S. Application Data

(63) Continuation of application No. PCT/EP98/05487, filed on Aug. 21, 1998.

(30) Foreign Application Priority Data

Aug. 22, 1997 (EP) ................................ 997202585

(51) Int. Cl.$^7$ ........................ C08G 18/00; C08G 18/28; C08G 12/00; C08G 59/00; C07D 323/00
(52) U.S. Cl. ........................ 528/26; 525/474; 525/477; 525/479; 525/509; 525/518; 525/519; 525/523; 525/529; 525/533; 528/27; 528/40; 528/73; 528/74; 528/116; 528/248; 528/287; 528/288; 528/291; 528/293; 528/294; 528/298; 528/310; 528/321; 528/322; 528/327; 528/337; 528/341; 528/344; 528/367; 528/370; 528/373; 528/398; 528/403; 528/405; 528/406; 528/407; 528/417; 528/421
(58) Field of Search ................................ 528/73, 74, 26, 528/27, 40, 116, 248, 287, 288, 291, 293, 528/294, 298, 310, 321, 322, 327, 337, 341, 528/344, 367, 370, 373, 398, 403, 405, 406, 528/407, 417, 421; 549/357, 435, 351; 525/474, 525/477, 479, 509, 518, 519, 523, 529, 533

(56) References Cited

U.S. PATENT DOCUMENTS

| | | | |
|---|---|---|---|
| 3,577,438 A | 5/1971 | Melaas | 549/510 |
| 4,338,240 A | 7/1982 | Mizutani et al. | 524/284 |
| 4,405,798 A * | 9/1983 | Hall et al. | 549/363 |
| 4,425,473 A * | 1/1984 | Mizutani et al. | 549/363 |
| 4,526,949 A * | 7/1985 | Hall et al. | 526/268 |
| 4,529,786 A * | 7/1985 | Hall et al. | 526/268 |
| 4,672,098 A * | 6/1987 | Herweh et al. | 526/268 |
| 4,788,288 A | 11/1988 | Pinschmidt, Jr. et al. | 544/212 |
| 4,798,745 A | 1/1989 | Martz et al. | 427/407.1 |
| 4,817,721 A * | 4/1989 | Pober | 166/295 |
| 4,864,055 A | 9/1989 | Pinschmidt, Jr. et al. | 560/160 |
| 5,155,170 A | 10/1992 | Baukema et al. | 525/15 A |
| 5,214,086 A | 5/1993 | Mormile et al. | 524/237 |
| 5,336,807 A | 8/1994 | Burgoyne, Jr. et al. | 564/153 |
| 5,721,020 A * | 2/1998 | Takami et al. | 427/508 |
| 6,297,329 B1 * | 10/2001 | van den Berg et al. | 525/410 |
| 6,548,617 B2 * | 4/2003 | van den Berg et al. | 528/73 |
| 6,593,479 B2 * | 7/2003 | van den Berg et al. | 549/363 |

FOREIGN PATENT DOCUMENTS

| | | |
|---|---|---|
| EP | 0 134 691 | 3/1985 |
| WO | WO 93/17060 | 9/1993 |
| WO | WO 97/31073 | 8/1997 |

OTHER PUBLICATIONS

Derwent Abstract No. JP 60 233114, dated Nov. 19, 1985.
H. Wagner et al., Lackkunstharze, 5$^{th}$ ed., 1971 pp. 5-12.
G. Li. Bassi et al., *Photoinitiators for the Simultaneous Generation of Free Radicals and Acid Hardening Catalysts*, Speciality Chemicals, Dec., 1987.
E.J. Corey et al., *A New General Synthetic Route to Bridged Carboxylic Ortho Esters*, Tetrahedron Letters, vol. 24, No. 50, pp. 5571-5574, 1983.

* cited by examiner

*Primary Examiner*—Rabon Sergent
(74) *Attorney, Agent, or Firm*—Joan M. McGillycuddy; Michelle J. Burke

(57) ABSTRACT

The invention pertains to a coating composition comprising a compound comprising at least one bicyclo-orthoester group and at least one other functional group. The invention also comprises a process for curing the present coating composition. Further, a process for making a bicyclo-orthoester-functional compound from the corresponding oxetane compound is described.

23 Claims, No Drawings

COATING COMPOSITION COMPRISING A COMPOUND COMPRISING AT LEAST ONE BICYCLO-ORTHOESTER GROUP AND AT LEAST ONE OTHER FUNCTIONAL GROUP

This is a continuation of International Application No. PCT/EP98/05487, with an international filing date of Aug. 21, 1998, designating the United States of America, expressly abandoned after the filing and acceptance of the present application. This application claims priority of European Patent Application No. 997202585.2, filed Aug. 22, 1997.

FIELD OF THE INVENTION

The invention pertains to a coating composition comprising a compound comprising at least one bicyclo-orthoester group and at least one other functional group.

BACKGROUND OF THE INVENTION

The use of compounds comprising bicyclo-orthoester groups in coating compositions is known from U.S. patent publication No. U.S. Pat. No. 4,338,240. In this patent publication the use and the preparation of bicyclo-orthoester-functional compounds (hereinafter bicyclo-orthoester will be abbreviated to BOE) is described. Described are, e.g., BOE-functional compounds, which are the adduct of two compounds comprising one hydroxyl group and one BOE group and one compound comprising two isocyanate groups. The compounds are cross-linked by means of cationic ring opening homopolymerisation of the BOE groups. In that case, however, the presence of moisture has to be excluded. Furthermore, energy in the form of ultraviolet, infrared or microwave irradiation or heat has to be supplied during the polymerisation process.

In an earlier patent application WO 97/31073, a coating composition is described comprising a first compound comprising at least one BOE group and a second compound comprising at least two hydroxyl-reactive groups.

It has now been found that a coating composition comprising a compound comprising at least one BOE group and at least one other functional group has similar properties as the coating compositions covered by the above-mentioned earlier patent application WO 97/31073.

A coating composition comprising a compound comprising at least one BOE group is a composition having latent hydroxyl groups. In the presence of water or moisture from the air the BOE groups will be hydrolysed, forming hydroxyl groups. This reaction is also known as deblocking. During deblocking few if any volatile components are released. When the BOE group is deblocked in this manner, it is not possible to obtain a homopolymer of BOE groups by cationic polymerization. However, when hydroxyl-reactive groups are present in the coating composition, the deblocked hydroxyl groups can react with the hydroxyl-reactive groups to give a cross-linked polymer.

The use of compounds comprising BOE groups in coating compositions has several advantages over the use of compounds having free hydroxyl groups, such as hydroxyl-functional reactive diluents, hydroxyl-functional main binders, e.g. polyester polyols and acrylate polyols, and even compounds where the BOE groups have already been hydrolysed.

Firstly, the viscosity of compounds comprising BOE groups is lower than that of the corresponding hydrolysed compounds. In consequence, less viscosity-reducing solvent which evaporates in air is needed in the coating composition.

Secondly, because of the stability of the BOE-functional compounds the pot life: drying time ratio of compositions according to the invention is particularly favourable, for hydrolysis only takes place in the presence of water or moisture.

Thirdly, in coating compositions of the present invention BOE-functional compounds have the advantage that hydrolysis of the BOE group produces a substantial increase in the composition's viscosity. A high viscosity will give reduced sagging of the coating composition on the substrate.

Finally, it has been found that the coating compositions of the present invention provide a high build behavior.

SUMMARY OF THE INVENTION

The coating composition of the present invention comprises a compound comprising at least one BOE group and at least one other functional group represented by the following formula I $$(A)_x\text{—}B\text{—}(C)_y \qquad (I)$$

wherein
x and y are independently selected from 1 to 10.

DETAILED DESCRIPTION OF THE INVENTION

In the formula of the present invention A has the structure according to the following formula II

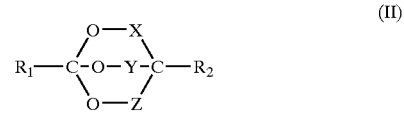

wherein
X and Z are independently from each other selected from linear or branched alk(en)ylene groups with 1–4 carbon atoms optionally containing an oxygen or a nitrogen atom;
Y is nothing or is selected independently of X and Z from linear or branched alk(en)ylene groups with 1–4 carbon atoms optionally containing an oxygen or a nitrogen atom;
one of $R_1$ and $R_2$ is selected from the group of monovalent radicals comprising hydrogen, hydroxyl, alk(en)yl groups comprising 1–30 carbon atoms which may be linear or branched and may optionally contain one or more hetero atoms and groups selected from the group of oxygen, nitrogen, sulphur, and ester; the other of $R_1$ and $R_2$ is selected from the group of divalent radicals comprising alk(en)ylene groups having 1–10 carbon atoms which groups may be linear or branched and contain one or more hetero atoms and groups selected from the group of oxygen, nitrogen, sulphur, and ester;
B is selected from the group of divalent radicals comprising aromatic, aliphatic, cycloaliphatic, and araliphatic hydrocarbon groups having 1–40 carbon atoms which groups may be linear or branched and contain one or more hetero atoms and groups selected from the group of oxygen, nitrogen, sulphur, phosphorus, sulphone, sulphoxy, amine, amide, urea, urethane, and ester; ester groups;

ether groups; amide groups; thioester groups; thioamide groups; urethane groups; and urea groups;
C is a functional group selected from the following formulae III–XLIII
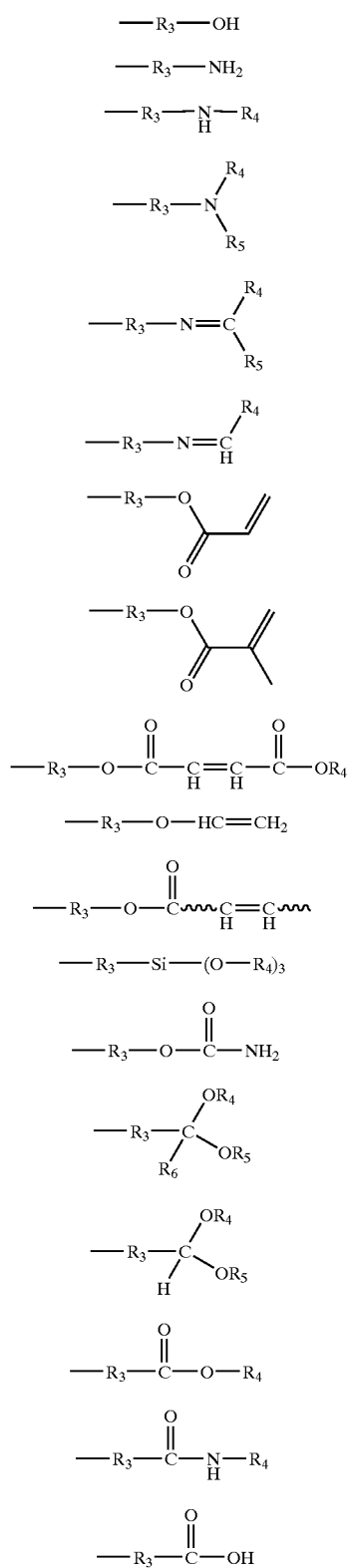
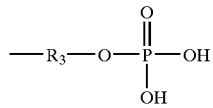
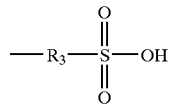
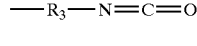
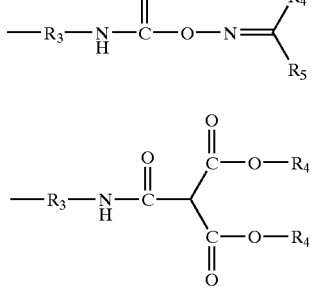
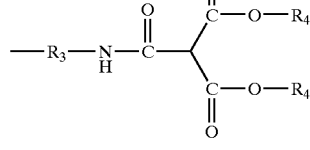
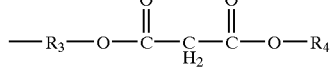
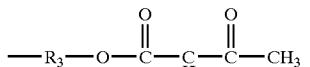
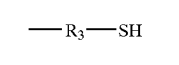
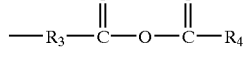
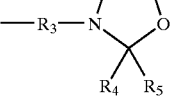
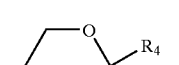
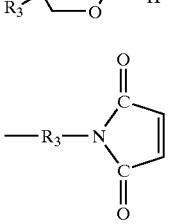

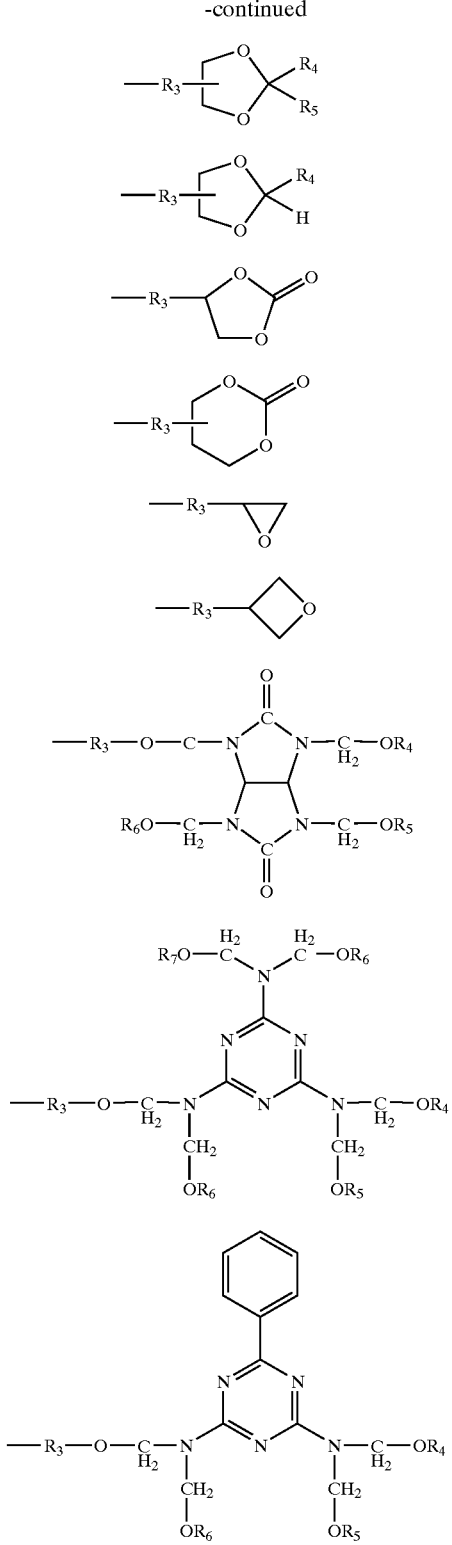

wherein R₃ is selected from the group of alk(en)ylene groups having 1–10 carbon atoms which groups may be linear or branched and may optionally contain one or more groups selected from the group of ether, ester, urea, urethane, amide, and amine, and $R_4$, $R_5$, $R_6$, $R_7$ and $R_8$ are independently from each other selected from the group of alk(en)yl groups having 1–10 carbon atoms which groups may be linear or branched.

Preferably, X, Y, and Z are methylene. $R_1$ and $R_2$ in that case are linked to a divalent 2,6,7-trioxabicyclo[2.2.2]octane radical.

Preferably, one of $R_1$ and $R_2$ is a monovalent radical selected from the group of linear or branched alk(en)yl groups having 1–20 carbon atoms. More preferably, the monovalent radical is selected from the group of methyl and ethyl.

Preferably, the other of $R_1$ and $R_2$ is selected from the group of alk(en)ylene groups having 1–10 carbon atoms containing one or more hetero atoms and groups selected from the group of oxygen and nitrogen. More preferably, the other of $R_1$ and $R_2$ is selected from —O—$C_{1-10}$—.

Preferably, B is derived from an organic polyisocyanate compound represented by the formula $D(NCO)_k$ wherein k is 2 or higher.

The organic polyisocyanate compound can be an aromatic, aliphatic, cycloaliphatic and/or araliphatic compound, adducts thereof, such as isocyanurates, uretdiones, biurets, or allophanates, or prepolymers thereof.

Examples of suitable polyisocyanates to be used as starting materials for preparing the first compound comprising at least one bicyclo-orthoester group and at least one other functional group include diisocyanates represented by the above formula wherein k is 2 such as ethylene diisocyanate, trimethylene diisocyanate, 1,2-propylene diisocyanate, tetramethylene diisocyanate, 2,3-butylene diisocyanate, hexamethylene diisocyanate, octamethylene diisocyanate, 2-ethyl-1,4-diisocyanate butane, 2-methyl-1,5-diisocyanate, 2,2,4-trimethyl hexamethylene diisocyanate, 2,4,4-trimethyl hexamethylene diisocyanate, dodecamethylene diisocyanate, α,α'-dipropyl ether diisocyanate, 1,3-cyclopentylene diisocyanate, 1-isocyanato-2-isocyanatomethyl cyclopentane, 1,2-cyclohexylene diisocyanate, 1,3-cyclohexylene diisocyanate, 1,4-cyclohexylene diisocyanate, 4-methyl-1,3-cyclohexylene diisocyanate, 1,3- and 1,4-bis(isocyanatomethyl)-cyclohexane, 1-isocyanato-1-methyl-4(3)-isocyanatomethyl cyclohexane, 4,4'-dicyclohexylene diisocyanate methane, 2,4'-dicyclohexylene diisocyanate methane, 3,3'-dimethyl-4,4'-dicyclohexylene diisocyanate methane, isophorone diisocyanate, m- and p-phenylene diisocyanate, o-, m-, and p-xylylene diisocyanate, 1,3- and 1,4-bis(isocyanate methyl) benzene, 1,5-dimethyl-2,4-bis(isocyanate methyl) benzene, 2,4- and 2,6-toluene diisocyanate, α,α,α',α'-tetramethyl o-, m-, and p-xylylene diisocyanate, 2,4'- and 4,4'-diphenylene diisocyanate methane, 4,4'-diphenylene diisocyanate, 3,3'-dichloro-4,4'-diphenylene diisocyanate, naphthalene-1,5-diisocyanate, and transvinylidene diisocyanate.

Other polyisocyanates include triisocyanates represented by the above formula wherein k is 3 such as 4-isocyanatomethyl-1,8-octane diisocyanate, 1,3,5-triisocyanate benzene, 2,4,6-toluene triisocyanate, 4,4',4"-triphenylmethane triisocyanate, and the adduct of trimethylol propane and m-tetramethyl xylylene diisocyanate, and polyisocyanates represented by the above formula wherein k is 4 or higher such as polyphenyl polymethylene polyisocyanates obtained by phosgenating aniline/formaldehyde condensates and (co)polymers of isocyanate-functional monomers such as α,α'-dimethyl-m-isopropenyl benzyl isocyanate.

Examples of biuret, isocyanurate, allophanate, and uretdione adducts, are the adduct of two molecules of hexamethylene diisocyanate or isophorone diisocyanate and a diol such as ethylene glycol, the adduct of 3 molecules of hexamethylene diisocyanate and 1 molecule of water, the adduct of 1 molecule of trimethylol propane and 3 molecules of isophorone diisocyanate, the adduct of 1 molecule of pentaerythritol and 4 molecules of toluene diisocyanate, the isocyanurate of hexamethylene diisocyanate, available from Bayer under the trade designation Desmodur® N3390, the uretdione of hexamethylene diisocyanate, available from Bayer under the trade designation Desmodur® N3400, the allophanate of hexamethylene diisocyanate, available from Bayer under the trade designation Desmodur® LS 2101, the biuret of hexamethylene diisocyanate, available from Bayer under the trade designation Desmodur® N75, and the isocyanurate of isophorone diisocyanate, available from Hüls under the trade designation Vestanat T1890.

Preferred polyisocyanate to represent $D(NCO)_k$ is the biuret of hexamethylene diisocyanate so that B has the following chemical structure

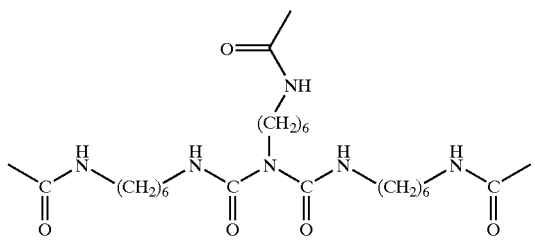

Preferably, x+y is equal to k.
Preferably, C is selected from the formulae XIV and XVII

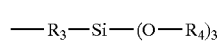
(XIV)

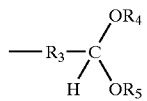
(XVII)

wherein $R_3$, $R_4$, and $R_5$ are as mentioned above. More preferably, $R_4$ and $R_5$ are methyl or ethyl and $R_3$ is a group selected from the following formulae XLIV–XLVI

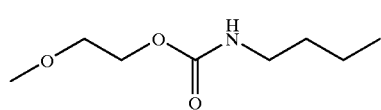
(XLIV)

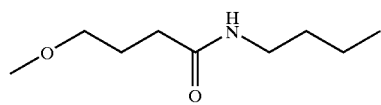
(XLV)

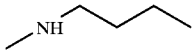
(XLVI)

The compound comprising at least one BOE group and at least one other functional group is able to self-crosslinking. This is in particular the case for a compound according to formula I wherein C is selected from the formulae XIV, XVI, XVII, XXIII, XXIV, XXV, XXX, XXXIX, XL, XLI, XLII, and XLIII. Accordingly, in a first aspect of the present invention the coating composition may contain only this compound as a reactive compound.

In a second aspect of the present invention a second compound comprising at least two hydroxyl-reactive groups may be present in the coating composition according to the invention. The hydroxyl-reactive groups are selected from the group of isocyanate, epoxy, acetal, carboxyl, anhydride, and alkoxy silane groups. Also, mixtures of these groups in one compound are included. Alternatively, the second compound can be an amino resin.

Examples of compounds comprising at least two isocyanate groups are aliphatic, cycloaliphatic, and aromatic polyisocyanates, adducts thereof, such as isocyanurates, uretdiones, biurets, or allophanates, or prepolymers thereof.

The polyisocyanates are selected from the group mentioned above represented by the formula $D(NCO)_k$ and mixtures thereof. The above-mentioned polyisocyanates, adducts and prepolymers thereof may be present in the form of blocked isocyanates as known to the skilled man. Preferred is the isocyanurate of hexamethylene diisocyanate.

Examples of compounds comprising at least two epoxy groups are solid or liquid epoxy compounds, such as the di- or polyglycidyl ethers of aliphatic, cycloaliphatic, or aromatic hydroxyl compounds such as ethylene glycol, glycerol, cyclohexane diol, mononuclear di- or polyvalent phenols, bisphenols such as Bisphenol-A and Bisphenol-F, and polynuclear di- or polyvalent phenols; polyglycidyl ethers of phenol formaldehyde novolac; epoxidised divinyl benzene; epoxy compounds comprising an isocyanurate group; an epoxidised polyalkadiene such as epoxidised polybutadiene; hydantoin epoxy resins; epoxy resins obtained by epoxidising aliphatic and/or cycloaliphatic alkenes, such as dipentene dioxide, dicyclopentadiene dioxide, and vinylcyclohexene dioxide; and glycidyl groups-comprising resins, such as polyesters or polyurethanes having two or more glycidyl groups per molecule; or mixtures of the aforementioned epoxy compounds. Preferably, use is made of the aforementioned cycloaliphatic compounds comprising two or more epoxy groups.

Alternatively, use is made of a (co)polymer of ethylenically unsaturated epoxy groups comprising compounds such as glycidyl(meth)acrylate, N-glycidyl(meth)acrylamide and/or allyl glycidyl ether and, if so desired, one or more copolymerisable, ethylenically unsaturated monomers.

Examples of compounds comprising at least two acetal groups are disclosed, int. al., in patent publications U.S. Pat. No. 4,788,288, U.S. Pat. No. 4,864,055, U.S. Pat. No. 5,155,170, and U.S. Pat. No. 5,336,807. Other suitable acetal-functional compounds include compounds obtained by reacting aminobutyraldehyde di(m)ethyl acetal (ABDA) and carboxyl ester-, isocyanate- or cyclocarbonate-functional (co)oligomers or (co)polymers, e.g., polyester, polyacrylate, and polyurethane. An example of such a polymer includes the copolymer of glycerol cyclocarbonate methacrylate and styrene. Also, mixtures of compounds comprising at least two acetal groups can be employed.

Examples of compounds comprising at least two carboxyl groups include saturated or unsaturated aliphatic, cycloaliphatic, and aromatic polycarboxylic acids, such as malonic acid, succinic acid, adipic acid, azelaic acid, sebacic acid, decane dicarboxylic acid, dimer fatty acid, maleic acid, tetrahydrophthalic acid, hexahydrophthalic acid, hexahydroendomethylene tetrahydrophthalic acid, phthalic acid, isophthalic acid, terephthalic acid, trimellitic acid, pyromellitic acid, 3,6-dichlorophthalic acid, tetrachlorophthalic acid, and mixtures thereof.

Examples of anhydride-functional compounds include radical polymers of an unsaturated cyclic anhydride monomer, e.g., maleic acid anhydride, itaconic acid anhydride, or citraconic acid anhydride. Furthermore, copolymers of said anhydride monomers and one or more ethylenically unsaturated monomers can be employed. These copolymers may contain 10–50 wt. % of anhydride groups. Examples of ethylenically unsaturated monomers are styrene, substituted styrene, vinyl chloride, vinylacetate, and esters of acrylic or methacrylic acid, e.g., methyl(meth)acrylate, ethyl(meth)acrylate, propyl(meth)acrylate, isopropyl(meth)acrylate, butyl(meth)acrylate, t-butyl(meth)acrylate, n-hexyl(meth)acrylate, 2-ethylhexyl(meth)acrylate, cyclohexyl(meth)acrylate, 2,2,5-trimethyl cyclohexyl(meth)acrylate, and isobornyl(meth)acrylate. The anhydride-functional (co)polymer may contain small quantities, e.g., 1 to 10 wt. %, of ethylenically unsaturated carboxylic acid groups, e.g., (meth)acrylic acid. The molecular weight of the anhydride-functional (co)polymer preferably is 1000–50 000.

When the coating composition according to the present invention is used as a top coat, the aforesaid ethylenically unsaturated monomer preferably may be used in a molar ratio of 1:1 with the anhydride monomer, as described in U.S. Pat. No. 4,798,745.

Alternatively, the anhydride-functional compound can be an adduct of an anhydride monomer and a functional group-comprising polymer. Examples of such adducts are: the adduct of polybutadiene or a butadiene/styrene copolymer and maleic acid anhydride; the adduct of maleic acid anhydride and a styrene/allyl alcohol copolymer esterified with an unsaturated fatty acid, resins of terpene and maleic acid anhydride; adducts of hydroxyl-comprising polymers and anhydride monomers, e.g., copolymers of hydroxyethyl (meth)acrylate or styrene/allyl alcohol and a tricarboxylic compound capable of forming anhydride groups, such as described in EP-A 0 025 917; the adduct of trimellitic acid anhydride and a polyol, such as described in EP-A-0 134 691; and the adduct of a thiol groups-comprising polymer and an unsaturated cyclic anhydride such as maleic acid anhydride, itaconic acid anhydride or citraconic acid anhydride. Also, mixtures of anhydride-functional compounds can be employed.

Examples of alkoxysilane-functional compounds are alkoxysilanes of the following general formula:

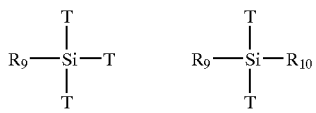

wherein T is a hydrolysable group such as —OCH$_3$, —OC$_2$H$_5$ or —OC$_2$H$_4$OCH$_3$ and R$_9$ and R$_{10}$ are reactive groups selected independently from each other. Examples of such reactive groups include vinyl, aminoalkyl, epoxyalkyl, and methacryloxyalkyl groups. Also, reaction products of alkoxysilane-functional compounds and mixtures of alkoxysilane-functional compounds and/or reaction products of these can be employed.

Examples of vinyl-functional alkoxysilanes include vinyl triethoxysilane and vinyl trimethoxysilane. As an example of a reaction product of a vinyl-functional alkoxysilane may be mentioned the silicone resin formed by the reaction of (CH$_2$=CHSiO$_{3/2}$)$_x$(R$_2$SiO)$_y$ and styrene.

Reaction products of amino-functional alkoxysilanes can be made by reacting such silanes with inorganic acids HA:

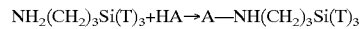

wherein A is the acid radical ion, or with esters of organic acids R$_{11}$(COOR$_{12}$)$_n$, wherein n is an integer of at least 1, R$_{11}$ is a linear or branched, optionally unsaturated, alkane radical, and R$_{12}$ is a lower alkyl group, e.g., a C$_{1-4}$ alkyl group, e.g.:

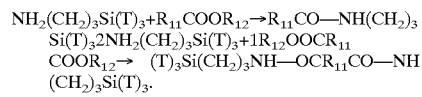

For example, the adduct of 1 mole diethyl malonate and 2 moles of 3-amino propyl trimethoxy silane is a suitable alkoxy silane containing compound. Also suitable for use are reaction products of amino-functional alkoxysilanes and isocyanate-functional compounds.

One example of a reaction product of an epoxy-functional silane compound is the reaction product of β-(3,4-epoxycyclohexyl) ethyl trimethoxysilane and amines, acids, and alcohols.

Examples of reaction products of methacryloxyalkyl trialkoxysilane are reaction products of γ-methacryloxypropyl trimethoxysilane and γ-methacryloxypropyl tri(β-methoxyethoxy)silane and vinyl-functional monomers, such as styrene and methyl methacrylate.

Examples of suitable amino resins are urea resins, guanamine resins, and melamine resins, and mixtures of these. Examples of urea resins are etherified methylol urea, butyl urea, and isobutyl urea. One example of a guanamine resin is tetra(methoxymethyl)benzoguanamine. Examples of melamine resins are hexa(methoxymethyl)melamine (HMMM) and isobutylated melamine.

In addition to the disclosed first compound comprising at least one BOE group and at least one other functional group and, optionally, said second hydroxyl-reactive compound, third compounds may be present in the coating composition according to the present invention. Such compounds may be main binders and/or reactive diluents comprising reactive groups which may be cross-linked with the aforesaid hydroxyl-functional compounds and/or hydroxyl-reactive compounds. Examples include hydroxyl-functional binders, e.g., polyester polyols such as described in H. Wagner et al., *Lackkunstharze*, 5th ed., 1971 (Carl Hanser Verlag, Munich), polyether polyols, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, such as castor oil and trimethylolpropane may be present. Finally, ketone resins, aspargyl acid esters, and latent or non-latent amino-functional compounds such as oxazolidines, ketimines, aldimines, diimines, secondary amines, and polyamines may be present. These and other compounds are known to the skilled person and are mentioned, int. al., in U.S. Pat. No. 5,214,086.

The ratio of hydroxyl-reactive groups to hydroxyl groups ranges from 50 to 300 eq. %, preferably from 70 to 250 eq. %.

The invention further encompasses a process for curing the present coating composition. More particularly, the latent hydroxyl groups of the BOE group of the first compound have to be deblocked and reacted with the hydroxyl-reactive groups of the first and/or second compound to allow the present coating composition to be cured.

The deblocking of the latent hydroxyl groups of the BOE group takes place under the influence of water in the form of, e.g., moisture from the air or added water. This deblocking is preferably catalysed by a first catalyst selected from the group of Lewis acids, such as $AlCl_3$, $SbCl_5$, $BF_3$, $BCl_3$, $BeCl_2$, $FeCl_3$, $FeBr_3$, $SnCl_4$, $TiCl_4$, $ZnCl_2$ and $ZrCl_4$ and organic complexes thereof, e.g., $BF_3Et_2O$, $BF_3$-$2CH_3COOH$, $BF_3$-$2H_2O$, $BF_3$—$H_3PO_4$, $BF_3$—$(CH_3)_2O$, $BF_3$—THF, $BF_3$-$2CH_3OH$, $BF_3$-$2C_2H_5OH$, and $BF_3$—$C_6H_5CH_2$, and Brønsted acids. Preferably, use is made of Brønsted acids having a pKa<3, such as a mono- or dialkyl phosphate, a carboxylic acid having at least one chlorine and/or fluorine atom, an alkyl or aryl sulphonic acid or an (alkyl)phosphoric acid, more particularly methane sulphonic acid, paratoluene sulphonic acid, optionally substituted naphthalene sulphonic acids, dodecyl benzene sulphonic acid, dibutyl phosphate, trichloroacetic acid, phosphoric acid, and mixtures thereof.

Said first catalysts may be blocked, if so desired, resulting in the release of the Lewis or Brønsted acid under the influence of, e.g., electromagnetic irradiation (light or UV), heat or moisture. Acid generating photoinitiators are described, int. al., in G. Li Bassi et al., "Photoinitiators for the Simultaneous Generation of Free Radicals and Acid Hardening Catalysts," *Radcure '86 Proceedings*, e.g. 2-methyl-1-[4-(methylthio)phenyl]-2-[4-methylphenylsulphonyl] propane-1-one (MDTA), ex. Fratelli Lamberti Spa, Varese, Italy. Alternatively, use may be made of Lewis acid generating compounds such as Irgacure® 261 ex Ciba Geigy and trimethyl silyl benzene sulphonic ester.

The first catalyst can be used alone or as a mixture of catalysts in effective amounts. The term effective amount in this case is dependent on the use of the first compound comprising at least one BOE group and at least one other functional group. When the first compound is used as a main binder, sufficient catalyst will have to be present to hydrolyse practically all BOE groups. However, if the first compound is used primarily as a reactive diluent while other compounds are present as main binders, the hydrolysation of at least a portion of the BOE group will suffice.

Amounts of 0 to 10 wt. % relative to the BOE groups of the first catalyst may be sufficient. Preferably, 0,3 to 8 wt. %, more specifically, 0,5 to 6 wt. %, will be present.

The reaction of the deblocked hydroxyl groups of the BOE-functional compound, the hydroxyl-reactive groups of the second compound, and, optionally, third compounds present in the composition comprising hydroxyl groups or hydroxyl-reactive groups, takes preferably place under the influence of a second catalyst. Such catalysts are known to the skilled person. The second catalyst is used in an amount of 0 to 10 wt. %, preferably 0,001 to 5 wt. %, more preferably in an amount of 0,01 to 1 wt. %, calculated on solid matter (i.e., the amount of first compound comprising at least one BOE group and at least one other functional group and, optionally, the second hydroxyl-reactive compound and the above-mentioned third compounds).

As an example for the various hydroxyl-reactive groups the following catalysts may be mentioned. Polyisocyanates: dimethyl tin dilaurate, dibutyl tin dilaurate, dibutyl tin diacetate, tin octoate, zinc octoate, aluminum chelate, and dimethyl tin dichloride; polyepoxy compounds: tertiary amines and Lewis acids such as $BF_3$ or organic complexes thereof; polyacetal compounds: paratoluene sulphonic acid and dodecyl benzene sulphonic acid; polycarboxylic compounds: dodecyl benzene sulphonic acid, polyanhydride compounds: organotin compounds; alkoxysilane compounds: organotin compounds, phosphoric acid, paratoluene sulphonic acid, dodecyl benzene sulphonic acid, and tertiary amines; and amino resins: dodecyl benzene sulphonic acid.

As can be noted from the above, the first and the second catalyst may be the same in some coating compositions. In that case, the amount of catalyst may be higher than indicated for the first or second catalyst alone.

The coating composition according to the invention may be part of a components system, for instance a 2-component system. Alternatively, a 3-component system may be employed.

In addition, a coating composition such as described may contain the usual additives such as solvents, pigments, fillers, leveling agents, emulsifiers, antifoaming agents and rheology control agents, reducing agents, antioxidants, HALS-stabilisers, UV-stabilisers, water traps such as molecular sieves, and anti-settling agents.

Application onto a substrate can be via any method known to the skilled person, e.g., via rolling, spraying, brushing, flow coating, dipping, and roller coating. Preferably, a coating composition such as described is applied by spraying.

The coating composition of the present invention may be applied to any substrate. The substrate may be, for example, metal, e.g., iron, steel, and aluminum, plastic, wood, glass, synthetic material, paper, leather, or another coating layer. The other coating layer may be comprised of the coating composition of the current invention or it may be a different coating composition. The coating compositions of the current invention show particular utility as clearcoats (over base coats, water-borne and solvent-borne), base coats, pigmented topcoats, primers, and fillers. The compositions are particularly suitable for refinishing motor vehicles and transportation vehicles and in finishing large transportation vehicles such as trains, trucks, buses, and aeroplanes.

The applied coating composition can be cured very effectively at a temperature of, e.g., 0–50° C. If so desired, the coating composition may be baked, e.g., at a temperature in the range of 50–150° C. This is in particular suitable for coating compositions comprising a compound of the formula I wherein C is selected from the formulae XV, XVIII, XXIV, XXV, XXVI, XXXVII, XXXVIII, XLI, XLII, and XLIII.

Compounds of the formula I wherein C is selected from the formulae IX, X, XI, XII, XIII, and XXXIV are in particular suitable in coating compositions wherein an extra crosslink step has to be carried out. Radical initiators may then be included in the coating composition, preferably radical initiators activated by UV or daylight.

It has been mentioned in the earlier patent application WO 97/31073 that BOE-functional compounds can be prepared by converting the corresponding ester-functional oxetane compounds with $BF_3Et_2O$, as described by E. J. Corey et al., *Tetrahedron Letters*, 24 (1983), pp. 5571–5574, or with a catalytic amount of a strong Brønsted or Lewis acid or organic complexes thereof.

It has now been surprisingly found that this conversion can be carried out in the presence of a catalytic amount of dibutyl tin oxide. More particularly, in the reaction of diethyl malonate and 3-ethyl-3-hydroxymethyl oxetane it has been found that above 180° C. the conversion takes place in the presence of at least 20 ppm of this catalyst, preferably 20–2000 ppm based on the oxetane compound. Preferably, the reaction temperature ranges from 190 to 240° C., more preferably from 200 to 240° C. The reaction period ranges from 0,5–10 hours, preferably from 2 to 8 hours.

A compound according to the following chemical structure is formed

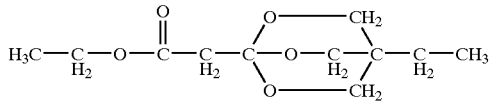

The invention will be elucidated further with reference to the following examples.

EXAMPLES

In the examples the following abbreviations are used:
paratoluene sulphonic acid:PTSA
dibutyl tin dilaurate:DBTL
methyl ethyl ketone:MEK
dodecyl benzene sulphonic acid:DDBSA In the examples the following compounds are used:
Byk 306 is a flow additive, ex. Byk Chemie.
Nacure 5076 is 70% DDBSA in isopropanol, ex. King Industries.
Desmodur® N3390 is an aliphatic polyisocyanate based on the isocyanurate of hexamethylene diisocyanate, ex. Bayer (solids content is 90% in butyl acetate).
Desmodur® N75 is an aliphatic polyisocyanate based on the biuret of hexamethylene diisocyanate, ex. Bayer (solids content is 75% in methoxy propanol acetate/xylene (1/1)).
MDUS 114 is a copolymer of α,α'-dimethyl-m-isopropenyl benzyl isocyanate and butyl acrylate (0.28:0.72 equivalents), upon which aminobutyraldehyde dimethyl acetal is added equimolar on isocyanate (solids content is 67% in butyl acetate; acetal equivalent weight is 1091).

Unless otherwise stated, the properties of the coating compositions and the resulting films are measured as follows:

A coating is "touch dry" when the mark formed by firm pushing with the thumb disappears after 1 or 2 minutes.

MEK resistance is measured by exposing the film to methyl ethyl ketone for one minute. In the test results, 0 means that the film was totally dissolved, and 5 means that the film was not damaged at all.

Example 1

Preparation of 4-ethyl-1-(ethoxycarbonylmethyl)-2,6,7-trioxabicyclo [2.2.2]octane (BOE 1)

Into a 4 l three necked flask equipped with a stirrer, a distilling column, a nitrogen in- and outlet, a heating jacket, a thermocouple, and a vacuum pump were charged 1920 g of diethyl malonate (12 moles), 464 g of 3-ethyl-3-hydroxymethyl oxetane (4 moles), and 2,5 g of dibutyl tin oxide. The reaction mixture was heated to 140° C. upon which temperature the ethanol distillation began. The reaction temperature was gradually increased to 200° C. during 6 hours. During this time 171 g of ethanol were collected as distillate. The temperature was lowered to 100° C. and the pressure was lowered to 29 mbar by application of vacuum. The excess diethylmalonate was distilled off. The pressure was further lowered to 0.03 mbar and the temperature was gradually increased to 156° C. Three fractions of distillate were collected. The third fraction (100–104° C./0.03 mbar) consisted of 379 g, which according to GC analysis contained 75% of 4-ethyl-1-(ethoxycarbonylmethyl)-2,6,7-trioxabicyclo[2.2.2]octane having the following structure

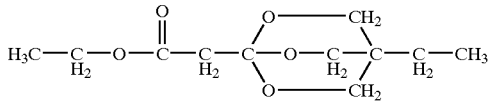

The BOE structure was confirmed by $^1$H NMR analysis (CDCl$_3$, δ /ppm): 0,85 (t,3H,CH$_3$); 1,2-1,3 (m, 5H,CH$_3$ & CH$_2$); 2,71 (s, 2H,CH$_2$); 3,93 (s, 6H,3 CH$_2$); 4,19 (q, 2H,CH$_2$).

Example 2

Preparation of an acetal- and BOE-functional compound (BOE 2)

A: Preparation of a hydroxyl- and acetal-functional compound

Into a 250 ml three necked flask equipped with a stirrer, a reflux condensor, a nitrogen in- and outlet, a heating jacket, a thermocouple, and addition funnel were charged 44 g of ethylene carbonate (0,5 moles) and 50 g 2-methoxy propylacetate and stirred at room temperature until dissolved. 66,5 g of aminobutyraldehyde dimethyl acetal (0,5 moles) was added to the solution during 30 minutes. During the addition, the temperature rose to 35° C. After the addition the mixture was heated to 80° C. and stirred at this temperature for 6 hours. Analysis of the resulting solution showed an amine number of 4,5 mg KOH/g which corresponds to a conversion of aminobutyraldehyde dimethyl acetal of 97,5%.

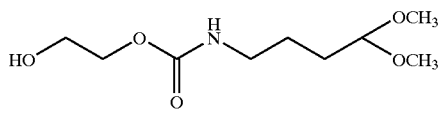

B: Preparation of 4-methylol-1-ethyl-2,6,7-trioxabicyclo [2.2.2]octane

Into a 4 l three necked flask equipped with a stirrer, a distilling column, a nitrogen in- and outlet, a heating jacket, a thermocouple, and a vacuum pump were charged 704 g of triethyl orthopropionate (4 moles), 528 g of pentaerythritol (4 moles), 400 g of diethylene glycol dimethyl ether, and 1,2 g of PTSA, and heated to 83° C. The temperature was gradually increased to 150° C. over a period of 6 hours. During this time 1050 ml of distillate were obtained, consisting of a mixture of ethanol and diethylene glycol dimethyl ether. The temperature was lowered to 100° C. Vacuum was applied to remove the remaining diethylene glycol dimethyl ether (60 mbar). The pressure was lowered to 0,02 mbar and 613 g of distillate were collected as a colourless oil boiling at 90° C./0,02 mbar. The oil was identified having the following structure

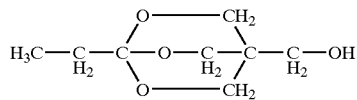

by its $^1$H NMR spectrum (CDCl$_3$, δ/ppm): 0,9 (t, 3H,CH$_3$); 1,6 (q, 2H,CH$_2$); 2,7 (t, 1H,OH); 3,4 (d, 2H, CH$_2$); 3,9 (s, 6H,3 CH$_2$).

C: Preparation of BOE 2

Into a 500 ml three necked flask equipped with a stirrer, a reflux condensor, a nitrogen in- and outlet, a heating jacket, a thermocouple, and addition funnel were charged 53 g of Desmodur® N75, the biuret of hexamethylene diisocyanate (0,2 equivalents), 40 g of 2-methoxy propyl acetate, and 1 g dibutyl tindilaurate. A mixture of 100 g 2-methoxy propyl acetate, 17,4 g 4-methylol-1-ethyl-2,6,7-trioxabicyclo[2.2.2]octane prepared as specified in Example 2B (0,1 moles), and 32,3 g of the hydroxyl functional acetal compound prepared as specified in Example 2A (0,1 moles) was added during 45 minutes at room temperature. The reaction mixture was stirred at 70° C. for 3 hours. After this time the IR spectrum indicated the absence of isocyanate groups (no signal at 2270 cm$^{-1}$). 2-Methoxy propyl acetate was partly distilled off until a solids content of 60% was reached.

Example 3

Preparation of an acetal- and BOE-functional compound (BOE 3)

A: Preparation of a hydroxyl- and acetal-functional compound

Into a flask equipped as in Example 2A were charged 43 g of γ-butyrolactone (0,5 moles). 66,5 g of aminobutyraldehyde dimethyl acetal (0,5 moles) was added to the solution during 30 minutes. After the addition the mixture was heated to 100° C. and stirred at this temperature for 6 hours. Analysis of the resulting solution showed an amine number of 5,8 mg KOH/g which corresponds to a conversion of aminobutyraldehyde dimethyl acetal of 98%.

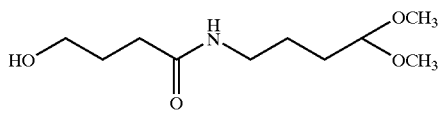

B: Preparation of BOE 3

Into a flask equipped as in Example 2C were charged 53 g of Desmodur® N75 (0,2 equivalents), 40 g of 2-methoxy propyl acetate, and 1 g dibutyl tindilaurate. A mixture of 100 g 2-methoxy propyl acetate, 17,4 g 4-methylol-1-ethyl-2,6,7-trioxabicyclo[2.2.2]octane prepared as specified in Example 2B (0,1 moles), and 21,9 g of the hydroxyl functional acetal compound prepared as specified in Example 3A (0,1 moles) was added during 45 minutes at room temperature. The reaction mixture was stirred at 70° C. for 3 hours. After this time the IR spectrum indicated the absence of isocyanate groups (no signal at 2270 cm$^{-1}$). 2-Methoxy propyl acetate was partly distilled off until a solids content of 60% was reached.

Example 4

Preparation of a siloxane- and BOE-functional compound (BOE 4)

Into a flask equipped as in Example 2C were charged 66,3 g of Desmodur® N75 (0,25 equivalents), 50 g of 2-methoxy propyl acetate, and 1,1 g dibutyl tindilaurate. A mixture of 50 g 2-methoxy propyl acetate and 21,8 g 4-methylol-1-ethyl-2,6,7-trioxabicyclo[2.2.2]octane prepared as specified in Example 2B (0,125 moles) was added during 45 minutes at room temperature. The reaction mixture was stirred at 70° C. for 2 hours. The mixture was cooled to room temperature and a solution of 27,6 g triethoxy-3-amino propyl silane in 50 g of 2-methoxypropyl acetate was added during 50 minutes. The reaction mixture was allowed to stand at room temperature overnight. After this time the IR spectrum indicated the absence of isocyanate groups (no signal at 2270 cm$^{-1}$). 2-Methoxy propyl acetate was partly distilled off until a solids content of 60% was reached.

Examples 5–13

Coating compositions were prepared as listed below (all amounts in parts by weight). The coating compositions were applied with a draw bar onto a steel plate to give a 50 μm film thickness after drying.

The results listed below show that the coating compositions of the present invention have acceptable properties.

|  | 5 | 6 | 7 | 8 | 9 | 10 | 11 | 12 | 13 |
|---|---|---|---|---|---|---|---|---|---|
| Desmodur ® N3390 | 8.4 | 2.8 | 2.8 | 2.8 | — | — | — | — | — |
| BOE 1 | 3.4 | — | — | — | — | — | — | — | — |
| BOE 2 | — | 3.9 | — | — | 3.9 | — | — | 3.5 | — |
| BOE 3 | — | — | 3.9 | — | — | 3.9 | — | — | 3.7 |
| BOE 4 | — | — | — | 3.9 | — | — | 3.9 | — | — |
| MDUS 114 | — | — | — | — | — | — | — | 5.5 | 5.5 |
| 10% Byk 306 | 0.5 | 0.5 | 0.5 | 0.5 | 0.25 | 0.25 | 0.25 | 0.5 | 0.5 |
| 10% Nacure 5076 | 0.9 | 0.4 | 0.4 | 0.4 | 0.4 | 0.4 | 0.4 | 1.0 | 1.0 |
| 10% DBTL | 0.5 | 0.3 | 0.3 | 0.3 | — | — | — | — | — |
| gel time in the pot | >1 w | >1 w | * | * | >1 w | >1 w | >1 w | >1 w | >1 w |
| Touch dry time | 2 hrs. | 5 hrs. | 4.5 hrs. | 20 min. | >1 w | >1 w | 10 min. | 3 hrs. | 3 hrs. |
| MEK resistance after 1 week | 4 | 4 | 5 | 5 | — | — | 3 | 1 | 1 |

* directly after mixing a gelling material originates at the bottom

We claim:

1. A coating composition comprising a compound comprising at least one bicyclo-orthoester group having latent hydroxyl groups and at least one hydroxyl reactive functional group represented by the following formula I

wherein x and y are independently selected from 1 to 10;

A has the structure according to the following formula II

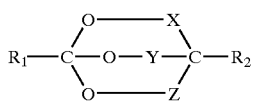
(II)

wherein
- X and Z are independently from each other selected from linear or branched alk(en)ylene groups with 1–4 carbon atoms optionally containing an oxygen or a nitrogen atom;
- Y is nothing or is selected independently of X and Z from linear or branched alk(en)ylene groups with 1–4 carbon atoms optionally containing an oxygen or a nitrogen atom;
- one of $R_1$ and $R_2$ is a monovalent radical of hydrogen, hydroxyl or alk(en)yl groups having 1–30 carbon atoms which are linear or branched and optionally contains oxygen atoms, nitrogen atoms, sulphur atoms, and/or ester groups; the other of $R_1$ and $R_2$ is a divalent radical with alk(en)ylene groups having 1–10 carbon atoms which groups are linear or branched and optionally contain oxygen atoms, nitrogen atoms, sulphur atoms, and/or ester groups;
- B is a divalent radical of aromatic, aliphatic, cycloaliphatic, and araliphatic hydrocarbon groups having 1–40 carbon atoms which groups are linear or branched and optionally contain oxygen atoms, nitrogen atoms, sulphur atoms, phosphorus atoms, sulphone groups, sulphoxy groups, amine groups, amide groups, urea groups, urethane groups, and/or ester groups; ester groups; ether groups; amide groups; thioester groups; thioamide groups; urethane groups; or urea groups;
- C is a hydroxyl reactive functional group selected from the following formulae:

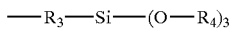
(XIV)

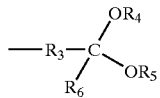
(XVI)

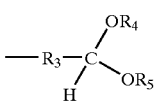
(XVII)

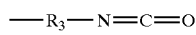
(XXIII)

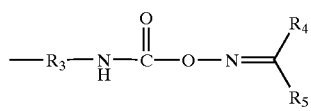
(XXIV)

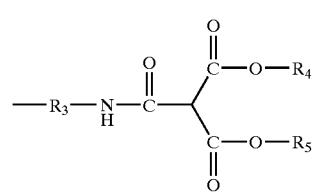
(XXV)

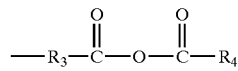
(XXX)

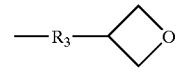
(XL)

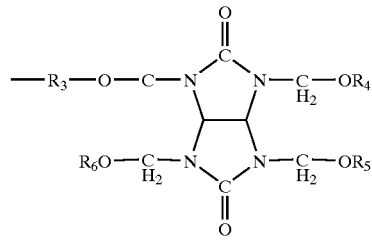
(XLI)

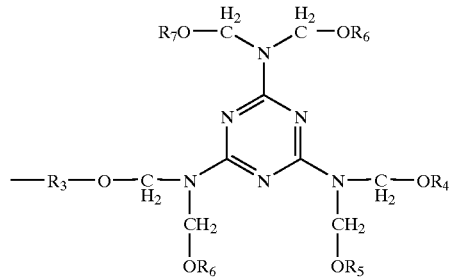
(XLII)

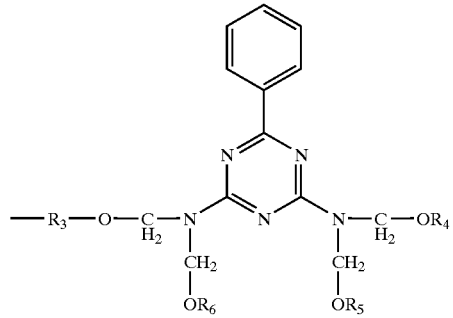
(XLIII)

wherein $R_3$ is selected from the group of alk(en)ylene groups having 1–10 carbon atoms which groups are linear or branched and optionally contain one or more ether, ester, urea, urethane, amide, and/or amine groups, and $R_4$, $R_5$, $R_6$, $R_7$ and $R_8$ are independently from each other selected from the group of alk(en)yl groups having 1–10 carbon atoms which groups are linear or branched.

2. A coating composition according to claim 1 wherein X, Y, and Z are methylene.

3. A coating composition according to claim 1 wherein one of $R_1$ and $R_2$ is a monovalent radical selected from the group of linear or branched alk(en)yl groups having 1–20 carbon atoms.

4. A coating composition according to claim 3 wherein the monovalent radical is methyl or ethyl.

5. A coating composition according to claim 3 wherein the other of $R_1$ and $R_2$ is —O—$C_{1-10}$—.

6. A coating composition according to claim 1 wherein B is derived from an organic polyisocyanate compound.

7. A coating composition according to claim 6 wherein the organic polyisocyanate is the biuret of hexamethylene diisocyanate and B has the following chemical structure

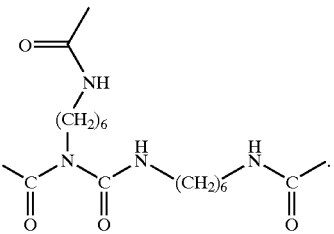
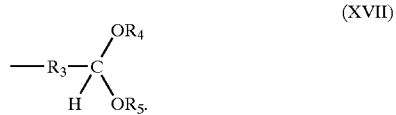

8. A coating composition according to claim 1 wherein C is selected from the formulae XIV and XVII

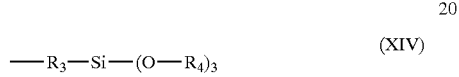

(XIV)

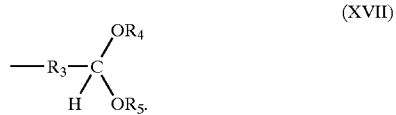

(XVII)

9. A coating composition according to claim 8 wherein $R_4$ and $R_5$ are methyl or ethyl and $R_3$ is a group selected from the following formulae XLIV–XLVI

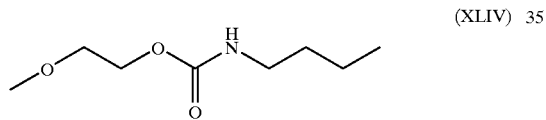

(XLIV)

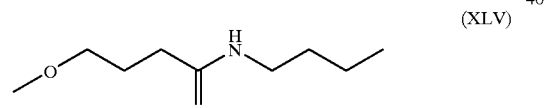

(XLV)

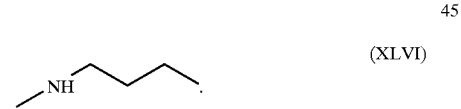

(XLVI)

10. A process for curing a coating composition according to claim 1 wherein the latent hydroxyl groups of the bicyclo-orthoester groups are deblocked in the presence of water, optionally in the presence of a first catalyst, and reacted with the hydroxyl-reactive groups of the compound, optionally in the presence of a second catalyst.

11. A coating composition comprising a first compound comprising at least one bicyclo-orthoester group and at least one other functional group wherein said first compound is either 4-ethyl-1-(ethoxycarbonylmethyl)2,6,7-trioxabicyclo[2.2.2]octane or represented by the following formula I $$(A)_x\text{—}B\text{—}(C)_y \qquad (I)$$

wherein x and y are independently selected from 1 to 10;

A has the structure according to the following formula II

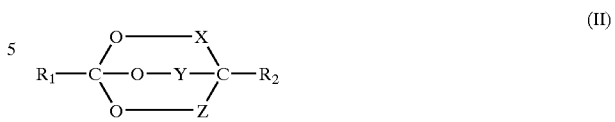

(II)

wherein

X and Z are independently from each other selected from linear or branched alk(en)ylene groups with 1–4 carbon atoms optionally containing an oxygen or a nitrogen atom;

Y is nothing or is selected independently of X and Z from linear or branched alk(en)ylene groups with 1–4 carbon atoms optionally containing an oxygen or a nitrogen atom;

one of $R_1$ and $R_2$ is a monovalent radical of hydrogen, hydroxyl or alk(en)yl groups having 1–30 carbon atoms which are linear or branched and optionally contains oxygen atoms, nitrogen atoms, sulphur atoms, and/or ester groups; the other of $R_1$ and $R_2$ is a divalent radical with alk(en)ylene groups having 1–10 carbon atoms which groups are linear or branched and optionally contain oxygen atoms, nitrogen atoms, sulphur atoms, and/or ester groups;

B is a divalent radical of aromatic, aliphatic, cycloaliphatic, and araliphatic hydrocarbon groups having 1–40 carbon atoms which groups are linear or branched and optionally contain oxygen atoms, nitrogen atoms, sulphur atoms, phosphorus atoms, sulphone groups, sulphoxy groups, amine groups, amide groups, urea groups, urethane groups, and/or ester groups; ester groups; ether groups; amide groups; thioester groups; thioamide groups; urethane groups; or urea groups;

C is a functional group selected from the following formulae:

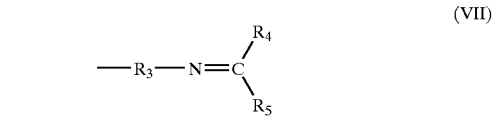

(VII)

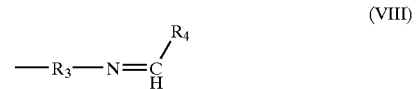

(VIII)

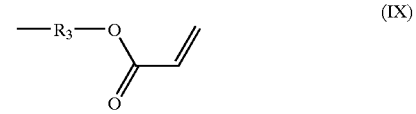

(IX)

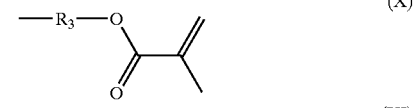

(X)

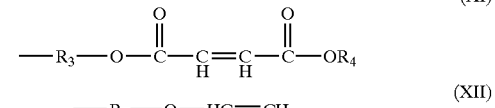

(XI)

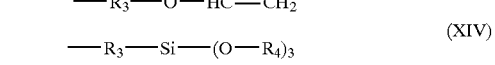

(XII)

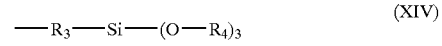

(XIV)

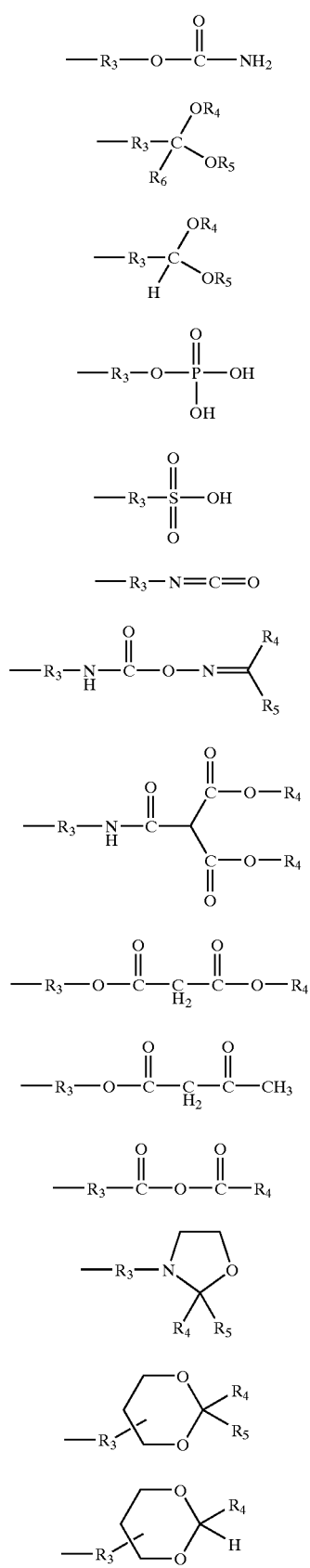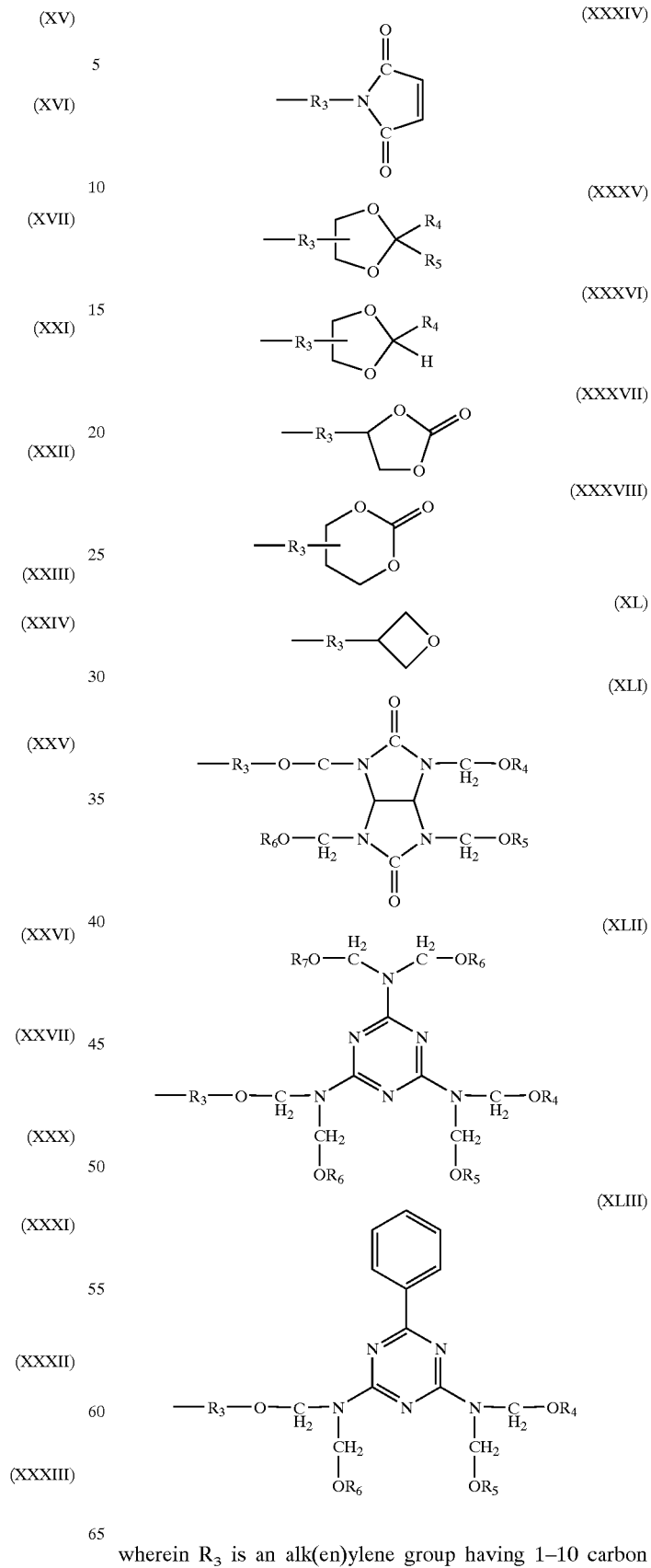
wherein $R_3$ is an alk(en)ylene group having 1–10 carbon atoms which groups are linear or branched and optionally contain ether, ester, urea, urethane, amide, and/or amine groups, and $R_4$, $R_5$, $R_6$, $R_7$ and $R_8$ are independently from each other selected from alk(en)yl groups having 1–10 carbon atoms which groups are linear or branched, wherein the coating composition comprises a second compound comprising at least two hydroxyl reactive groups of isocyanate, epoxy, acetal, carboxyl, anhydride, and/or alkoxy silane groups, or the second compound is an amino resin.

12. A coating composition according to claim 11, wherein the second compound comprising at least two hydroxyl reactive groups is an aliphatic, cycloaliphatic or aromatic compound comprising at least two isocyanate groups or adducts thereof.

13. A coating composition according to claim 12 wherein the second compound comprising at least two hydroxyl reactive groups is an isocyanurate.

14. A coating composition according to claim 11 wherein X, Y, and Z are methylene.

15. A coating composition according to claim 11 wherein one of $R_1$ and $R_2$ is a monovalent radical of linear or branched alk(en)yl groups having 1–20 carbon atoms.

16. A coating composition according to claim 15 wherein the monovalent radical is selected from the group of methyl and ethyl.

17. A coating composition according to claim 15 wherein the other of $R_1$ and $R_2$ is —O—$C_{1-10}$—.

18. A coating composition according to claim 11 wherein B is derived from an organic polyisocyanate compound.

19. A coating composition according to claim 18 wherein the organic polyisocyanate is the biuret of hexamethylene diisocyanate and B has the following chemical structure

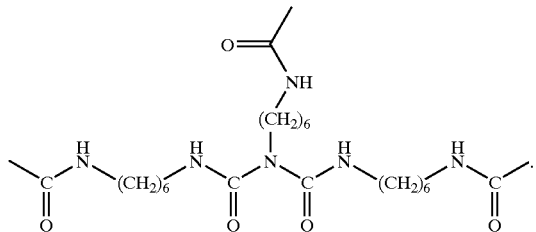

20. A coating composition according to claim 11 wherein C is selected from the formulae XIV or XVII

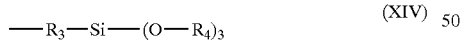   (XIV)

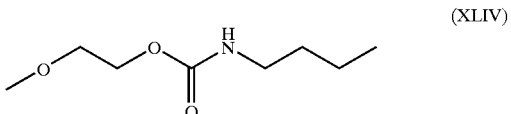   (XVII)

21. A coating composition according to claim 20 wherein $R_4$ and $R_5$ are methyl or ethyl and $R_3$ is a group selected from the following formulae XLIV–XLVI

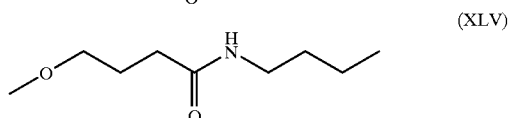   (XLIV)

(XLV)

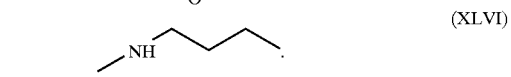   (XLVI)

22. A process for curing a coating composition according to claim 11 wherein the latent hydroxyl groups of the bicyclo-orthoester groups are deblocked in the presence of water, optionally in the presence of a first catalyst, and reacted with the hydroxyl reactive groups of the first and/or second compound, optionally in the presence of a second catalyst.

23. A process for the preparation of a compound comprising at least one bicyclo-orthoester group and at least one other functional group according to the formula

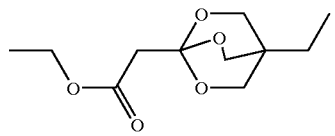

in which a compound having at least one oxetane group is converted in the presence of a catalytic amount of dibutyl tin oxide at a temperature above 180° C.

* * * * *

UNITED STATES PATENT AND TRADEMARK OFFICE
CERTIFICATE OF CORRECTION

PATENT NO.        : 6,979,719 B1                                   Page 1 of 1
APPLICATION NO. : 09/510061
DATED             : December 27, 2005
INVENTOR(S)       : Hobel et al.

It is certified that error appears in the above-identified patent and that said Letters Patent is hereby corrected as shown below:

Claim 1:
    Col. 18, line 30
        "$OR_6$" should read -- $OR_8$ --

Claim 11:

Col. 21, line 38

"$C\text{-}O\text{-}R_4$" should read -- $C\text{-}O\text{-}R_5$ --

Col. 22, line 50

"$OR_6$" should read -- $OR_8$ --

Signed and Sealed this

Twenty-fourth Day of October, 2006

JON W. DUDAS
*Director of the United States Patent and Trademark Office*